Oct. 11, 1932.   W. ASHTON   1,882,378
ANIMAL TAG
Filed June 4, 1930
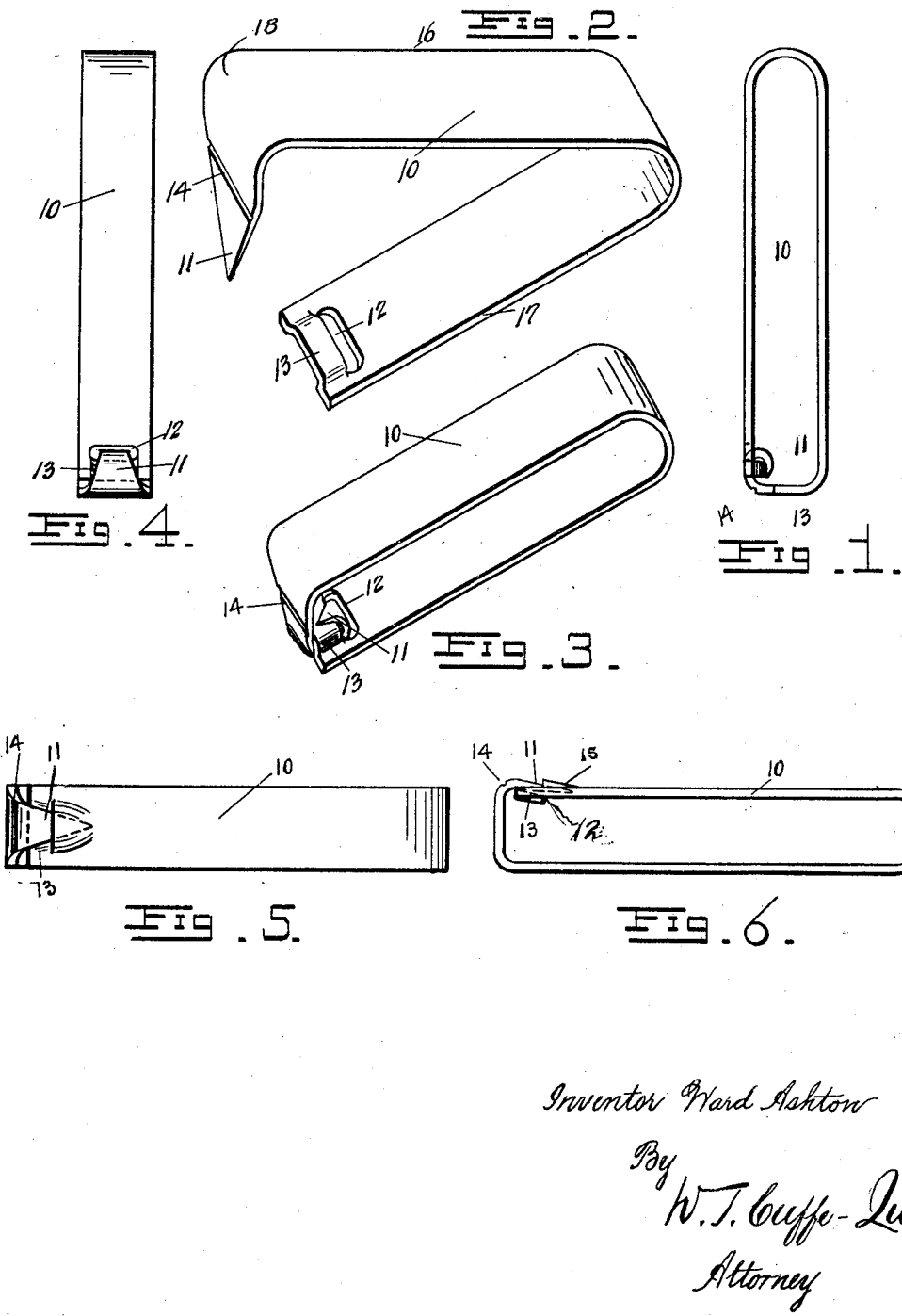
Inventor Ward Ashton
By W. T. Cuffe-Quin
Attorney Patented Oct. 11, 1932

1,882,378

UNITED STATES PATENT OFFICE

WARD ASHTON, OF OTTAWA, ONTARIO, CANADA, ASSIGNOR TO JOHN ORMOND KER, OF OTTAWA, CANADA

ANIMAL TAG

Application filed June 4, 1930. Serial No. 459,237.

This invention relates to marking tags for animals and birds.

The objects of the invention are to provide an identification tag adapted to be applied to the ear of an animal and to the wings of birds, of light and durable construction with a continuous smooth outer surface whereby all danger of the tag catching in objects is avoided.

With tags at present and heretofore in use, certain protrusions have remained after the tag is clinched in the animal's ear, and, subsequently, very often through the irritation of the pierced ear, the animal rubs against some object, when the protrusions catch in the object and further irritate the wound.

I am aware that many attempts have been made to overcome this objection by slotting one end of the tag and passing the other end upwardly through such slot and then clinching it, also by providing two slots in one end passing the other end upwardly through the first slot and then curling it downwardly through the second slot, but these methods leave the sharp extremity of the slotted end still protruding, and liable to catch in an object, also form bulges in the exposed surface of the strip when folded and clinched. With my construction all this is entirely eliminated, as while I form a slot in one end of the tag, I bring or fold the opposite pointed end around over the extremity of the slotted end, not up through it, and then pass the pointed end downwardly through the slot and clinch it, not on the face, but on the under side, between the folded portions of the tag, and thus prevent any bulge or protuberance anywhere on the outer surface.

The invention further provides certain novel features forming part of and co-operating with the device described in the preceding paragraphs.

Reference is now had to the accompanying drawing in which examples of the invention are disclosed and in which:

Fig. 1 is a side view of the tag closed.

Fig. 2 is a perspective view of the folded tag open.

Fig. 3 is a perspective view of the folded tag closed.

Fig. 4 is a front view of the tag closed.

Fig. 5 is a plan view of a modified form of the tag.

Fig. 6 is a side view of the same.

Referring now more particularly to the drawing, 10 designates the tag, comprising a flat metallic strip of pliable metal, one end of which is pointed as at 11, for piercing the ear of an animal or the wing of a bird. The opposite end of the strip is provided with a slot or opening 12, while the extremity 13, of the strip is indented or bevelled to receive the pointed end when bent around against the outer surface of the said slotted end. As illustrated in Fig. 1, the strip may also be weakened by a transverse groove, 14, adjacent the pointed end or elsewhere as may be required. This feature is in itself not particularly novel, and is for the purpose of preventing any tampering with the tag when clinched, without breaking it, and thereby affording detection.

In Figs. 5 and 6, a modified form of the invention is disclosed, in which instead of having the slot or opening 12, therethrough, the surface of the tag is continuous but is formed with a guard 15, with which the pointed end of the folded tag may engage after passing through the indentation 13, formed in the extremity of the blunt end and extending inwardly from the free edge thereof and terminating at the guard 15.

In operation, the strip of metal is bent substantially midway thereof as shown in Fig. 1, to provide upper and lower arm portions 16 and 17 respectively. The upper arm portion 16, is comparatively long and has its free end portion bent as at 18, to terminate in the piercing point, 11. The extremity of the lower arm 17, is bevelled or indented as at 13, so that when the pointed end is brought around and over the end 13, it will fit snugly therein flush with the surface of the strip and thus provide on the outside of the strip a continuous smooth surface all around.

It should also be noted that in addition to providing, when attached, a continuous, uninterrupted outer surface, sufficient space is automatically provided between the folded arms of the tag to permit play of the ear without objectionable contact therewith and thus avoiding irritation and, consequently, inflammation and pain. In short, the tag is so constructed and applied that suffering of any kind on the part of the animal to which it is attached is practically eliminated.

Various forms of the apparatus described will suggest themselves to those skilled in the art; it is, therefore, not intended that the present application should be limited to any particular form of construction; modifications may be made in the apparatus above described within the scope of the claims, without departing from the spirit or scope thereof.

What I claim for my invention is:

1. An identification tag for the ears of animals, the wings of birds and such like, comprising a pliable metallic strip having an opening associated with one end and an indentation in said end extending inwardly from the free edge thereof and terminating at said opening, said indentation being of such depth and width as to receive the opposite end of the tag and permit the same to be flush with the outer surface of the folded tag.

2. An identification tag comprising a pliable metallic strip having a pointed portion at one end and an opening adjacent the other end, an indentation in said other end adjacent said opening and formed in such manner that the pointed end of the strip, after being bent around the indented end of the strip and passed into said opening, will lie flush with the outer surface of the strip.

3. An identification tag for the ears of animals, the wings of birds and such like, comprising a pliable metallic strip bent between the ends to form upper and lower leg portions of unequal length, the lower short leg portion having an opening therein adjacent its extremity, the upper leg portion being comparatively long and including a curved pointed end adapted to pierce the ear of the animal and to be bent around against the outer surface of the short lower leg portion, inserted in the opening in said leg portion and then clinched between the folded leg portions.

In witness whereof I have hereunto set my hand.

WARD ASHTON.